United States Patent [19]

Greene

[11] Patent Number: 4,478,081

[45] Date of Patent: Oct. 23, 1984

[54] WHEEL ADAPTERS FOR TRUING AND BALANCING TIRES

[75] Inventor: Aubrey E. Greene, Ellaville, Ga.

[73] Assignee: Amermac Inc., Ellaville, Ga.

[21] Appl. No.: 435,853

[22] Filed: Oct. 21, 1982

[51] Int. Cl.³ .............................................. G01M 1/06
[52] U.S. Cl. ......................................... 73/487; 157/21
[58] Field of Search ...................... 73/487; 157/14, 21; 51/DIG. 33

[56] References Cited

U.S. PATENT DOCUMENTS 3,583,238  6/1971  Haynes ................................... 73/487
4,093,311  6/1978  Maus ..................................... 157/14
4,354,386  10/1982  Newton ................................. 73/487

FOREIGN PATENT DOCUMENTS 2807343  8/1978  Fed. Rep. of Germany ........ 73/487
1189969  4/1970  United Kingdom .................. 73/487

Primary Examiner—James J. Gill
Attorney, Agent, or Firm—Edwin E. Greigg

[57] ABSTRACT

Adapters are provided for mounting automobile wheel assemblies of different sizes and types to the mandrel of a wheel balancing or tire truing machine. The adapters have few parts and precisely align the wheel assembly with the mandrel.

8 Claims, 10 Drawing Figures

WHEEL ADAPTERS FOR TRUING AND BALANCING TIRES

BACKGROUND OF THE INVENTION

This invention is directed to wheel balancing and tire truing and more particularly to adapters that can be used for balancing and truing tires on any sized wheel and lug hole arrangement with the minimum number of parts.

Heretofore, various types of different equipment have been used for static and dynamic balancing of tires and wheels. One such type which is well known and used throughout the tire industry makes use of a back-up plate with a conical adapter that fits into the center hole of the wheel. The conical adapter is then secured in place by a wing nut or any other suitable means. Such as device is not exact and the tires are not always in balance.

Known patents directed to dynamic wheel balancing are as follows: U.S. Pat. Nos. 2,927,821; 3,376,075; 3,427,077, 3,889,542; and 4,188,828.

SUMMARY OF THE INVENTION

The adapters of the present invention permit balancing and truing tires with more precision than with any known devices and with a minimum number of parts and least effort. In order to provide an adapter for every known vehicle up to 1980, there is required only two different adapters of inch type lugs—one for four-lug rims and one for five-lug rims, and two different adapters for metric-type lugs—one for four-lug rims and one for five-lug rims. The adapters are formed with spaced apertures whose centers lie on a circle in which the center of the circle is the center of the plate. The apertures are formed of increasingly larger radius equally spaced from its adjacent aperture in the adjacent circle of apertures. One such adapter plate for a four-lug rim requires seven such circles of apertures, each with a greater radius from the center of the adapter plate than the other.

All adapters are used with a single back-up plate which includes a centrally located threaded tubular member over which the adapter is placed. The adapter is secured to the back-up plate by use of a wing nut and spaced from the back-up plate by suitable pods. For precision balancing of the assembly, an eccentric cam is used to secure the assembly in place on a mandrel.

It is therefore an object of the present invention to provide an adapter assembly for truing and balancing tires.

Another object is to provide an assembly by which one can true and balance a tire with the greatest of precision.

Another object is to provide an adapter assembly which is of simple construction and can be used by an unskilled mechanic, as well as by a skilled mechanic.

Another object is to provide an adapter assembly which does not require any threaded studs.

Other objects and advantages will become obvious to those skilled in the art in light of the drawings and following specifications.

DETAILED DESCRIPTION OF THE DRAWINGS

Figure 1:
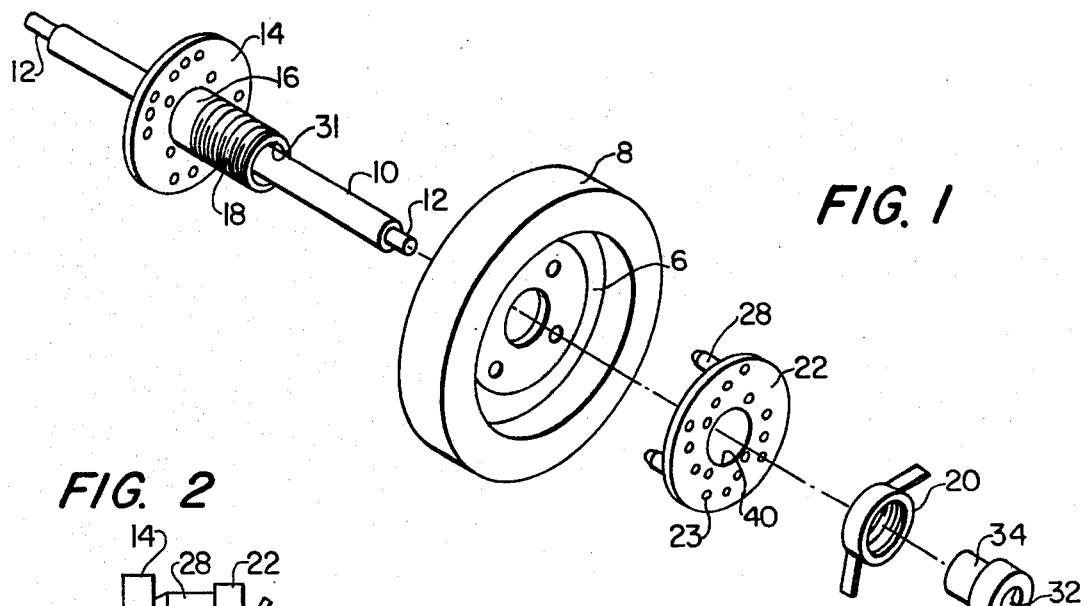
FIG. 1 is an exploded view of the relative parts of a wheel balancing and truing assembly.
Figure 2:
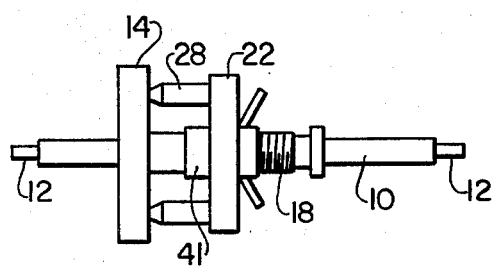
FIG. 2 illustrates the wheel support assembly secured together without a wheel in place.
Figure 8:
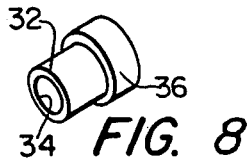
FIG. 8 illustrates a cam used for securing the mandrel to the backing plate-adapter assembly.
Figure 3A:
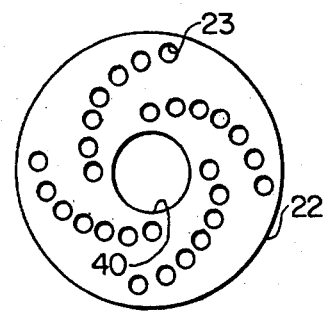
FIGS. 3a and 3b illustrate adapter plates for four-lug and five-lug type wheels of the inch type.
Figure 3B:
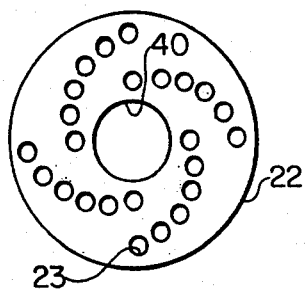
Figure 4A:
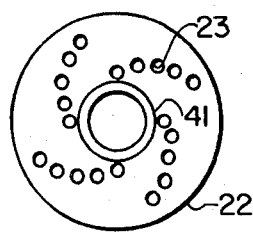
FIGS. 4a and 4b illustrate adapter plates for four-lug and five-lug type wheels of the metric type.
Figure 4B:
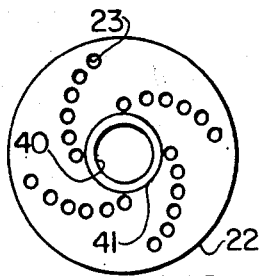
Figure 7:
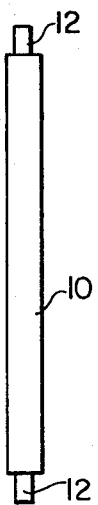
FIG. 7 illustrates a mandrel used in the assembly.
Figure 5:
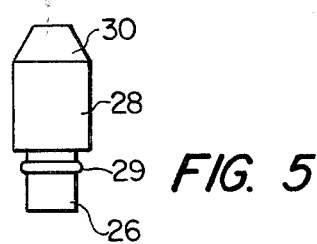
FIG. 5 illustrates a short and a long pod used for spacing the adapters from the backing plate.

FIG. 1 is an exploded view illustrating the relative parts of the elements for assembling a wheel 6 for truing a tire 8 and balancing the assembled wheel. As shown, a smooth surface mandrel 10 having cut-down unthreaded, smooth ends 12 extends through a back-up plate 14 which has a central aperture with a tubular extension 16 extending from one surface of the back-up plate in axial alignment therewith. The tubular extension is threaded along its end 18 to receive thereon a threaded wing nut 20. An adapter 22 along with the wing nut secures the wheel to the back-up plate. The adapter is provided with apertures 23 of a particular configuration. In order to secure the wheel against rotation relative to the back-up plate and the adapter, unthreaded pods are secured to the adapters by use of an o-ring and are placed between the lug holes 24 in the rim and the adapter.

The pods are made of solid metal with a small cylindrical end 26 and a large end 28. The small end is provided with a circular groove in which an o-ring 29 is placed in order to hold the small end of the pod in one of the apertures 23 in the adapter plate when in use. The large end of the pod is cut down into a conical end section 30, which conical end fits into the lug hole of the wheel when assembled in place. The wing nut screws against the adapter plate on one side and with the small end of the pods secured in the apertures in the adapter plate, the conical ends of the pods fit into the lug holes 24 in the wheel. The pods secure the wheels against rotation relative to the adapter plate and the back-up plate.

The inside surface 31 of the threaded end of the tubular extension for a short distance from its outer end is shaped to be slightly out-of-round, that is, eccentric, to receive therein an eccentric cam which fits over the manderal with a close fit. The inenr diameter 32 of the cam is of uniform diameter and slides over the mandrel with the cam end 34 fitting into the end of the backing plate tubular extension. The outside surface of the small end of the cam is turned down so that it is shaped as a thirty-thousandths eccentric. The turned-down end will then slide into the eccentric turned-down end of the tubular extension. The cam is then rotated relative to the backing plate tubular element so that the cam locks the mandrel within the assembly. The large end 36 of the cam is knurled and also has flat, cut surfaces so that a wrench can be used to tighen and loosen the cam. The only screw threads are those on the circumference of the tubular extension and the wing nut.

The adapters are formed of flat plates having a central aperture 40 with a hub 41 about the aperture 40 on one side thereof which fits over the threaded end of the backing plate tubular extension 1 with a tight fit. The adapter is provided with apertures 23 therein which have a definite set pattern formed by different circles of apertures with either four or five apertures formed in each circle about the central aperture. The circles of apertures are so formed that each circle of four or five apertures will fit the wheel of a different vehicle. It has been determined that twenty-five different aperture circles are required to accommodate the wheels presently used on the vehicles. In order to accommodate twenty-five different aperture circles—four plates are provided: one plate with four apertures per circle and one plate with five apertures per circle for metric dimensioned wheels; and one plate with four apertures per circle and one plate with five apertures per circle for inch dimensioned wheels.

The pattern of apertures is formed in a plate with the sets of apertures equiangularly spaced relative to each other with their centers on the circumference of a circle whose center coincides with the center of the adapter plate. Each additional circle of apertures is angularly spaced relative to the adjacent circle of apertures which have a lesser radius. Of course, the smallest circle of apertures will be closest to the center of the plate. The apertures formed on circles of greater radius are formed so that the next circle of apertures having the next greatest radius is equi-angularly spaced from the apertures in the adjacent circle with a lesser radius. In this manner the pattern of apertures will be formed on a curved line from the centermost aperture circle to the outermost aperture circle. In order to make it easy on the user, the circles of apertures are numbered from one up to the maximum number, which is seven for the plate with the greatest number of aperture circles. The plates are also indentified as (4 mm), (5 mm), (4 in) or (5 in). Further, in order to make it easy for selecting the correct plate and correct adapter pattern a booklet or adapter guide including every make of car has been published and is provided with each set of adapters. The adapter guide sets forth the make and model of the vehicle, the lug circle, the number of lugs and whether inch or mm, and then the pattern for that vehicle. The pattern designates the aperture circle number on the particular plate.

In use for truing a tire and balancing a wheel, the backing plate is positioned on a horizontal surface with the tubular extension up so that the assembled wheel can freely fit over the tubular extension. The mandrel is slid through the backing plate so that a portion extends from the side of the backing plate and a portion extends from the tubular extension. The wheel, with the mounted tire, is placed over the tubular extension with the wheel cover side of the wheel up.

The proper adapter plate is selected and the pods are arranged in the correct circle of apertures in the adapter plate, as set forth in the adapter guide. The small end of the pod is inserted into the aperture of the adapter plate and is held therein by the o-ring that surrounds the small end of the pod. The adapter plate is placed over the tubular extension with the assembed pods toward the wheel. The conical ends of the pods are placed in each lug hole in the wheel. The wing nut is then tightened against the adapter plate. A rubber hammer may be used to strike the wing element of the wing nut in order to tighten the wing nut against the adapter plate. The cam element is then slid over the end of the mandrel, fitted into the end of the tubular extension and rotated to tighten the assembly onto the mandrel. The mandrel should be fixed in such a position that the backing plate-adapter plate assembly positions the wheel at the center along the mandrel. If the wheel has four lug holes, the four-aperture plate is used; if the wheel has five lug holes, the five-aperture plate is used. The number of pods used is determined by the number of lug holes, one pod for each lug hole. Once the wheel has been assembled onto the backing plate-adapter assembly and the mandrel has been locked in place by the cam, the entire assembly is lifted and placed in or on the tire truing and/or wheel balancing machine. In placing the assembly on a tire truing-wheel balancing machine, bearings are placed onto the small ends of the mandrel and the ends of the mandrel with the bearings thereon are secured in the machine. The wheel can then be rotated in the machine as the mandrel rotates. The above assembly is for regular type wheels. Special type wheels such as "mags" require a different assembly arrangement because of the wheel design of the "mags". "Mags" wheels are assembled by use of special threaded studs 42, whereas the pods set forth above are used with regular type wheels. The studs are provided with a tab 44 from which a pin 46 extends parallel with the stud. The stud 42 fits through one aperture of a circle of apertures; then the pin on the tab fits into an adjacent aperture. All of the tabs must be facing in the same direction and inserted into the same aperture circle so that balance will not be lost.

In assembly of a "mag" wheel using the studs, the studs are slipped through the proper circle of apertures in the adapter plate from the back toward the front of the adapter plate. The tab pin then fits into an adjacent aperture of the adjacent circle of apertures so that all of the tabs are facing in the same direction and in the corresponding aperture circle. The studs are directed through the lug holes in the wheel and nuts are threaded onto the studs in order to secure the mag wheels to the adapter plate. The adapter plate with the "mag" wheel is then mounted onto the backing plate tubular extension and secured in place by use of the wing nut as set forth above. The mandrel is secured in place in the assembly by the cam and the assembly is ready for the truing and balancing machine.

The tabs on each stud provide additional support for the studs to ensure that the "mag" wheels are held in their proper position during truing and/or balancing. The studs have o-rings thereon which hold the studs within the apertures during assembly of the wheel and the adapter plate.

Some wheels have three, and some have six, lugs; therefore, the backing plate has been provided with patterns of apertures 48 on aperture circles for three and six lugs. Such an arrangement is used mainly with very small car wheels and with truck wheels. In this case, the pods are inserted into the apertures of the backing plate and the conical ends of the rods fit into the lug apertures of the truck type wheel. The adapter plate is secured in place as set forth above and then becomes the backing plate. The adapter guide manual indicates when the backing plate is to be used.

Figure 6:
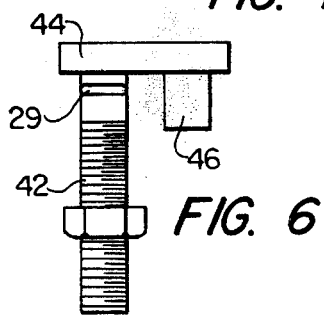
FIG. 6 illustrates long and short studs used for "mag" type wheels.

It is well known that wheels have different depths of depression; therefore short or long pods may be required. Also, "mag" wheels are different and may require long or short studs. These are provided. Different length pods and different length studs are shown in FIG. 6.

The adapter-backing plate assembly is made so that it is balanced; therefore, when a wheel is assembled thereon the tire may be trued and/or balanced. The only screw threaded elements used are the wing nut and associated tubular extension on the backing plate and the studs when used for "mag" wheels.

In normal operation for standard wheels, the hub on the adapter plate will be facing toward the backing plate. However the adapter plate can be used with the hub side out toward the wing nut, or the adapter plate could be made without a hub so that the entire facial is flat but is provided with the plurality of circles of apertures.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An assembly for truing and/or balancing a tire comprising:
    a backing plate including an integral, centrally located tubular extension extending from said backing plate in axial alignment therewith,
    an adapter that fits over said tubular extension coaxial therewith,
    said adapter including a set pattern of apertures therein,
    said set pattern of apertures in said adapter plate is formed with the apertures equi-angularly spaced relative to each other with their centers being on the circumference of a circle with the center of the circle coinciding with the axis of said adapter plate with apertures on circles of increased radius angularly spaced from an adjacent circle of apertures of lesser radius,
    spacer means separating said adapter from said backing plate,
    and means for securing said adapter on said tubular extension of said backing plate.

2. An assembly as claimed in claim 1, in which:
    said spacer means are pods,
    said pods having a nonthreaded end that fits into one of said apertures of said adapter plate,
    said nonthreaded end having an o-ring thereon for holding said pod in said aperture.

3. An assembly as claimed in claim 1 which includes:
    a mandrel that extends through said backing plate and said tubular extension, and
    means for securing said mandrel to said backing plate and said tubular extension.

4. An assembly as claimed in claim 3, in which:
    said mandrel is of a smooth surface, and
    said means for securing said mandrel in place is a cam means.

5. An assembly as claimed in claim 4, in which:
    said spacer means are pods,
    said pods having a nonthreaded end that fits into one of said apertures of said adapter plate,
    said nonthreaded end having an o-ring thereon for holding said pod in said aperture.

6. An assembly as claimed in claim 5, wherein:
    said means for securing said adapter on said tubular extension is a wing nut.

7. An assembly for truing and/or balancing a tire comprising:
    a backing plate including an integral, centrally located tubular extension extending from said backing plate in axial alignment therewith,
    an adapter that fits over said tubular extension coaxial therewith,
    said adapter including a set pattern of apertures therein,
    spacer means separating said adapter from said backing plate,
    said spacers are threaded studs,
    said studs having an attached tab, and
    a pin extending from said tab parallel with said stud,
    said pin being spaced from said stud a distance equal to a spacing between said apertures in adjacent circles of apertures for supporting said stud,
    and means for securing said adapter on said tubular extension of said backing plate.

8. A kit for forming an assembly for truing and/or balancing a tire comprising:
    a backing plate;
    said backing plate including a tubular extension;
    said tubular extension having a threaded, outer end portion;
    said tubular extension having an eccentric inner end portion;
    a plurality of adapter plates, each of said adapter plates having a different set pattern of apertures therein to accommodate different lug arrangements of different wheels measured in inches and millimeters;
    a plurality of long pods;
    a plurality of short pods;
    a plurality of long studs;
    a plurality of short studs;
    each of said studs including a tab and a pin extending from said tab parallel with said stud;
    a wing nut for securing said one of said plurality of said adapter plates onto said backing plate tubular extension;
    a mandrel, and
    a cam having an eccentric end for securing said mandrel to said tubular extension.

* * * * *